United States Patent

Coleman

[15] 3,704,722
[45] Dec. 5, 1972

[54] CAM AND DOOR ASSEMBLY
[72] Inventor: Clarence B. Coleman, Oakland, Calif.
[73] Assignee: Fabricated Metals Inc.
[22] Filed: July 12, 1971
[21] Appl. No.: 161,548

[52] U.S. Cl. .................................137/242, 251/203
[51] Int. Cl. ...........................................F16k 25/00
[58] Field of Search ........49/449, 450, 209; 141/363; 137/242, 244; 251/203

[56] References Cited

UNITED STATES PATENTS

| | | | |
|---|---|---|---|
| 2,064,567 | 12/1936 | Riley | 137/244 |
| 2,550,984 | 5/1951 | Ferguson | 137/244 |
| 3,182,954 | 5/1965 | Borger | 251/203 |
| 3,354,918 | 11/1967 | Coleman | 141/363 |

*Primary Examiner*—Kenneth Downey
*Attorney*—Manfred M. Warren et al.

[57] ABSTRACT

An improved closure assembly for bulk material containers of the type having a discharge opening defined by a frame shaped to receive a closure plate wherein an annular surface of the frame is provided with a seal. The end of the frame wherein the closure plate is inserted and withdrawn has associated with it a bracket which carries a sealing gasket facing the bottom side of the plate. A pair of elongate cam carrying members are rotatably mounted parallel to opposite sides of the opening frame and are maneuverable to at least two positions which in the one instance urges the closure plate into sealed contact with the gasket disposed on the frame annular surface; and in another position relieves the plate from the latter engagement while maintaining wiping contact between the sealing gasket on the aforementioned bracket and that portion of the annular seal where the closure plate is withdrawn.

5 Claims, 11 Drawing Figures

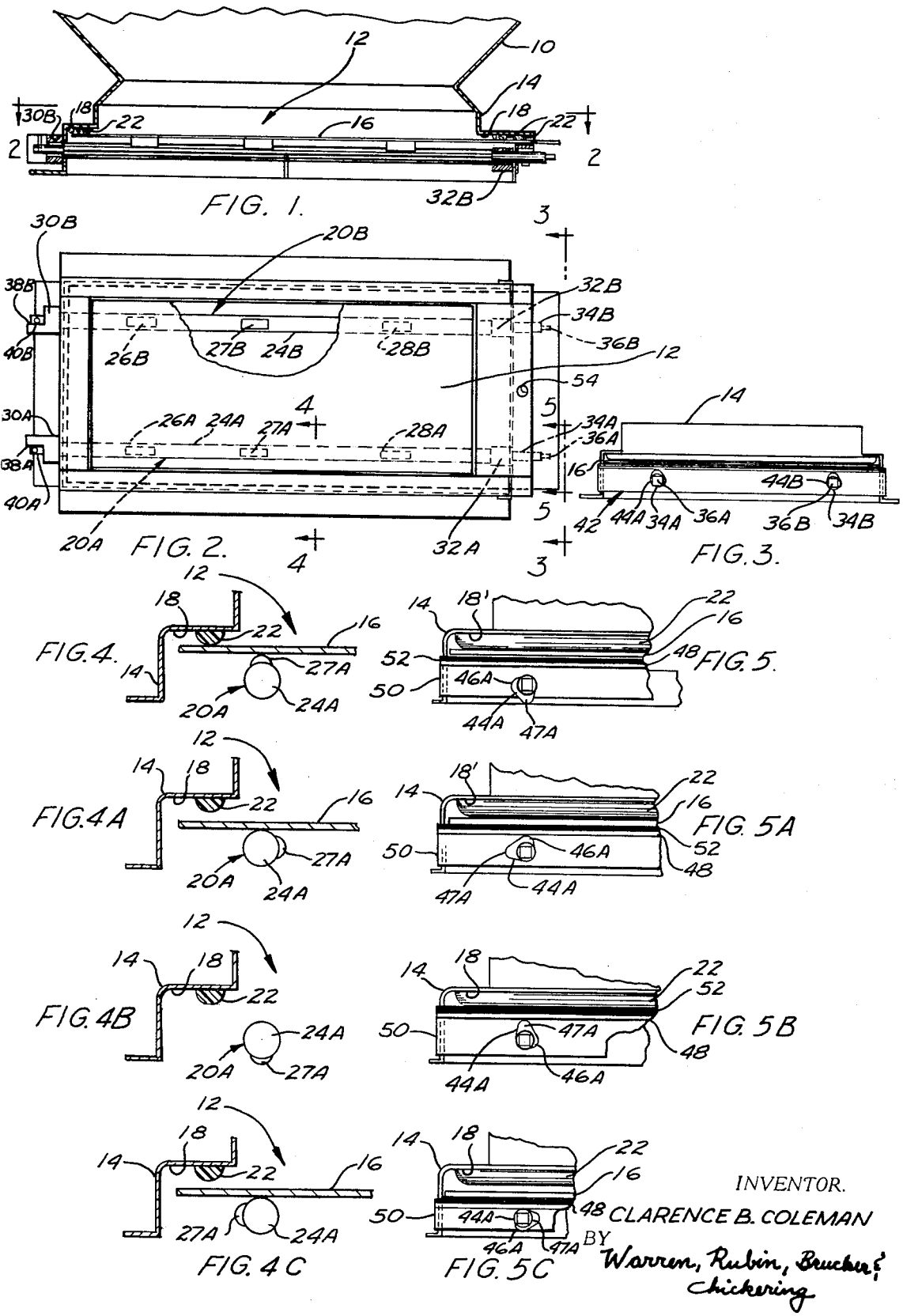

CAM AND DOOR ASSEMBLY

In my U.S. Pat. No. 3,354,918 for BIN AND UNLOADING STAND, patented Nov. 28, 1967, I disclose a bulk material container for the storage, transport, and discharge of various materials, including, but not limited to, those with a high degree and percentage composition of fines, such as flour, coal, and the like; or even heavy or relatively high viscosity liquids. To best handle such materials, particularly when discharging at an unloading station for further processing, disposition or storage, I have found a bottom discharge assembly preferable; and in the arrangement that I disclose in my U.S. Pat. No. 3,354,918, I utilize such a bin having a rectangular bottom discharge opening defined by a flanged frame. That portion of my earlier disclosure corresponds to the flange of the present invention depicted as member 14 in the various figures of the drawing which accompanies this specification. It should be emphasized, however, that the subject matter and scope of the instant invention is not limited to the combination of a closure assembly with a bin and unloading stand as disclosed in my U.S. Pat. No. 3,354,918. Rather the present invention is directed to an improved discharge closure assembly which may operate with salutary results not only with a bottom discharge bin with the aforementioned unloading stand, but with a wide variety of material containers, including even those with discharge openings that are somewhat off to one side of the bin bottom; or where the bin bottom design is of an asymmetrical or special nature.

Turning again to the closure assembly shown in may U.S. Pat. No. 3,354,918, an assembly sometimes referred to in the trade as a cam-lock door, while such an assembly has operated with good results and may continue to be used in a great many applications, there are certain problems which arise with this type of door assembly which the present invention overcomes.

For example, my older closure design which is clearly disclosed at FIG. 3 of the U.S. Pat. No. 3,354,918 patent, utilizes a closure plate inserted in the discharge frame opening which is designed to receive the closure plate. The plate is then urged upward by means of a plurality of manually operated cam-locks which force the plate into pressurable and sealed engagement with a gasket secured to an annular surface of the discharge opening frame. When a bulk material container full of material to be discharged is placed over a receiving hopper, also clearly illustrated in the drawing of my aforementioned patent, the closure plate is removed by releasing the cam-locks and manually withdrawing the closure plate. However, when this is done an opening is left exposed where the plate has withdrawn; then, as the fine particle material pours from the container to the receiving hopper, a certain amount of the material is blown out through the plate opening by virtue of the air displacement caused by the discharge of the material into the receiving hopper. Various attempts to provide a flap or other casual closure have not proved successful because of the force with which the displaced air from the receiving hopper acts upon the fine particles of the material being unloaded so that the resultant leakage tends to be persistent. More positive sealing off, as by a positively secured flange or seal, requires additional operator responsibility and time for making such attachment in a region where dust particles will have already begun to pollute the atmosphere and make an already belated adjustment difficult if not hazardous.

Moreover, with solutions to the problem of bin discharge leakage indicated above, placement of the closure plate into the bin discharge opening when the bin is empty is complicated by the necessity of either having to remove an attached seal or plate, or manipulating a flap or other external closure assembly which, if it is capable of restraining leakage during discharge of the bin, will probably prove difficult to maneuver manually when replacing the closure plate.

We have also found that in the case of the individual manual cam-locks, particularly in relatively small discharge openings where only two such cam-locks are used per side of the discharge frame, the operator may on occasion permit the plate to slide under rather than over the end cam-locks, thus causing malfunction of the unit.

Thus it is an object of the present invention to provide an improved closure assembly which is relatively simple to operate and at the same time provides a relatively leak proof arrangement when the closure plate is being removed, as well as such leak proofness after the closure plate is entirely removed and material continues to discharge from the bin to a receiving hopper.

It is a further object of my invention to provide a closure assembly which, when the bin with which it is associated is empty, may have its closure plate easily and rapidly repositioned without the necessity of the operator struggling with or having to remove cover flaps, seals, plates or the like.

These and other objects, features, and advantages of my invention should be apparent to one of ordinary skill in the art upon a reading of the specification which follows and with reference to the accompanying drawing.

Turning now to the drawing,

FIG. 1 is a sectional side elevation of the lower portion of a bulk material container, particularly the discharge opening portion thereof, embodying my invention;

FIG. 2 is a plan sectional view taken along line 2—2 of FIG. 1;

FIG. 3 is an end elevational view as viewed from line 3—3 at FIG. 2;

FIG. 4 is a partial sectional view taken along line 4—4 of FIG. 2 and showing with greater particularity certain details of structure embodying my invention and with a certain portion thereof at a specified position;

FIG. 5 is a partial end view taken along line 5—5 in FIG. 2 and is somewhat enlarged to better illustrate certain structure of my invention and corresponds to the position of one element thereof referred to in the above description of FIG. 4;

FIGS. 4A–4C correspond to FIG. 4, except that the element referred to in the description of FIG. 4 as corresponding to a particular position is shown in various other positions in subsequent FIGS. 4A–4C; and FIGS. 5A–5C correspond to FIG. 5 except that the element referred to therein as being in a given position is shown in various other positions in a manner similar to the explanation thereof in the description of FIGS. 4A through 4C.

FIG. 1 shows the bottom portion of bulk material container 10 whose discharge opening 12 is defined by frame 14 which houses and embodies my invention. The improved closure assembly includes plate 16 which is shown in position overlaying opening 12 and annular surface 18, frame 14 being shaped to form an annulus which defines discharge opening 12.

For sake of clarity, I have not shown a material carried within bulk material container 10, although that should now be imagined and further that such material contains a high degree and percentage composition of fines, as is found in the case of flour, coal, and like material. Such material may be retained with a high degree of leak proof integrity utilizing my discharge closure assembly and more particularly this is achieved in accordance with the present invention by cam assemblies 20A and B acting in cooperation with closure plate 16 and closure seals 22. More specifically, and as shown in FIGS. 1 through 5 inclusive, each cam assembly 20A and B comprises an elongate member or rod 24A (a corresponding B element will relate to the other cam assembly but may not be specifically recited in this specification to avoid unnecessary repetition) which has secured thereto within the region of the closure opening two or more cam elements 26A, 27A, and 28A. Cam rod 24A is rotatably mounted in conventional bushing assemblies 30A and 32A located respectively at opposite ends thereof and in turn welded, braised, or otherwise suitably secured to opposite end legs of frame 14. In the first position shown in FIGS. 1 through 5, and as may especially be appreciated by turning to FIGS. 4 and 5, cam elements 26A-28A urge closure plate 16 into pressurable contact with closure gasket 22 which forms a continuous sealing element between the plate and annular surface 18 to which the gasket is permanently secured. It should be noted that with appropriate selection of materials closure gasket 22 could be eliminated and plate 16 urged directly against annular surface 18, although I prefer to provide the gasket arrangement. In accordance with the foregoing description, a bulk material container embodying my invention is thus in condition for transporting about prior to subsequent unloading of the material contained therein for further disposition and/or processing. The angular rotation and positioning of rods 24A and B is achieved by means of extension sections 34A and B which are further formed to provide square wrench ends 36A and B. Then by conventional wrenches, an operator may rotate rods 24A and B to their desired position; bushing assemblies 30A and B are formed to provide stop surfaces 38A and B; and each of the rod ends are provided with pins 40A and B so that over travel of rod rotation is prevented. The cams tend to retain the set position of FIGS. 1 through 5 by virtue of the pressurable contact of cam elements 26-28 against plate 16.

Upon relocation of the bulk material container and its contents to the place where the material is to be discharged therefrom, closure plate 16 may be removed. Preferably such discharge occurs into a receiving hopper or other suitable receptacle, and I especially prefer to utilize the type of unloading stand which I have disclosed in my aforementioned U.S. Pat. No. 3,354,918. However, as indicated earlier, my present invention may be utilized independently of any such arrangement, and with other prior art receptacles.

When withdrawal of closure plate 16 is desired and material within bulk material container 10 discharged, it is a particular feature of my invention that virtually no leakage of material occurs as the plate is removed nor thereafter as material continues to cascade through the discharge opening. Such highly desirable result is achieved in accordance with the present invention by means of the cam assemblies previously described co-functioning with bracket and sealing gasket assembly 42 and its associated cam elements 44A and 44B, one of which, 44A, is seen in greater detail in FIGS. 5-5C.

More specifically when the bulk material container is in position ready for discharge, cam rods 24A and 24B (reference hereinafter will be to 24A only, although the same applies to 24B) are rotated in a clockwise direction from the position shown in FIGS. 4 and 5 to that of FIGS. 4A and 5A. This relieves the pressurable contact of plate 16 up against closure gasket 22. At the same time however, cam element 44A is rotated such that portion 46A thereof bears against leg 48 of bracket 50. Leg 48 in turn carries sealing gasket 52 which thus bears up against the bottom of plate 16 and urges its upper surface into close contact with gasket 22, which incidentally along annular surface portion 18' is in two sections. Now, with the operator pulling plate 16 by means of finger hole 54 in slidable movement transverse to the one end of frame 14, the closure plate may be removed. Yet while this is done leakage of material through and around where the closure plate is withdrawn from frame 14 is prevented by the sealable yet sliding contact of closure seal 22 on the upper side of plate 16 and sealing gasket 52 on the lower side thereof.

After the plate is completely withdrawn cam rod 24a may be further rotated in the clockwise direction so that camming section 47A is urged against bracket leg 48. Note that cam 47A is of greater eccentricity than 46A so that bracket leg 48 is elevated even further thus bringing sealing gasket 52 into direct contact with closure gasket 22, thereby sealing off the closure plate entry space entirely. This provides a further advantage of my invention of providing a positive and convenient method of sealing the discharge opening of the bulk material container so as to prevent leakage of material as discharge continues after plate closure removal.

It should be noted that while I have described above three distinct positions of cam rod 24A, and hence of cam element 44A, including those positions which bring cam sections 46A and 47A to bear against bracket leg 48, this conceivably could have been done with but two positions of cam rod 27A. That is, the position of rod 24A associated with FIGS. 4A and 5A (while closure plate 16 is still being withdrawn from the closure frame) could also serve for the position of cam rod 24A shown in FIGS. 4B and 5B; that is after closure plate 16 is entirely withdrawn, and it is desirable to close off the opening that it had occupied by means of contact between sealing gasket 52 and closure seal 22, this could be achieved by proper choice and resilience of gaskets 22 and 52. More specifically such materials could be chosen which, after removal of plate 16 from between the gaskets, such material would further expand to fill the gap without the need of further elevating bracket leg 48. However, I have found it preferable to utilize the construction exemplified by the description hereinabove in connection with FIGS. 4-4B and 5-5B.

It is a further desirable aspect of my invention that when an empty bin requires placement of closure plate 16 to overlay the discharge opening, this is achieved with very little effort and with no additional disassembly of plates, seals, or maneuvering of flaps or the like. That is, as can be seen in FIGS. 4C and 5C, after the container is completely discharged, cam rod 24A may be further rotated so that cam element 44A permits lowering of bracket 50 creating clearance between all seal and gasket surfaces which are more than equal to the thickness of plate 16. Thereafter, plate 16 may be easily placed in the discharge opening overlay position. Then, cam rod 24A may be rotated to the position shown and originally described hereinabove in respect of FIG. 4. This places the closure plate in close sealing contact with closure gasket 22 thus sealably overlaying the entire discharge opening and annular surface associated with frame 14. Note in this position that cam element 44A is out of contact with bracket leg 48 and sealing gasket 52 is relieved from plate 16.

It should be appreciated that while I have described my invention above in respect of one embodiment thereof, a number of variations are possible within the spirit and scope of the appended claims. For example, the closure gasket 22 may take various forms, and the particular type of cams and camming surfaces shown and described are merely illustrative and not intended to limit the type of cam arrangement which may be used.

I CLAIM:

1. In a bulk material container of the type having a discharge opening defined by a frame shaped to form an annulus having a surface in the plane of the opening, and a closure plate shaped to overlay said opening and annular surface, said plate adapted for slidable movement transverse to one end of said frame into the overlay position, a closure assembly comprising:

bracket means movably mounted adjacent to said one end of the frame for carrying a sealing gasket to
   1. pressurably engage one face of said closure plate when the latter is slidably moved and positioned to the overlay position, or
   2. to pressurably engage said one end surface of the frame when said closure plate is entirely removed; and cam means mounted proximate each of two opposite sides of said frame and adjacent to said one end surface for alternately camming said closure plate and bracket means when in different camming positions, said cam means maneuverable to at least a first and a second position, said first position characterized by said cam means urging the other face of said closure plate into pressurable contact with the annular surface of said opening frame while causing said bracket means and sealing gasket to locate out of contact with said closure plate, and said second position characterized by said cam means out of contact with said closure plate while urging said bracket means and sealing gasket into pressurable contact with said one face of the closure plate, so that when the cam means is in the latter position said closure plate may be slidably withdrawn from the overlay position while said sealing gasket is urged to pressurably contact the closure plate, thus blocking leakage of material from said container around the closure plate and the end of said frame over which the plate is being slidably withdrawn.

2. The closure assembly in accordance with claim 1 and wherein further said cam means maneuverable to third and fourth positions, said third position characterized by said cam means out of contact with said closure plate while urging said bracket means and sealing gasket into pressurable contact with said one end surface of the frame, so that when said closure plate is entirely removed from said discharge opening the plate passage through which said plate is withdrawn may be entirely closed off to prevent leakage there through of material from said bulk container, and said fourth position characterized by said cam means out of contact with said closure plate and said support means, so that said closure plate may be fully maneuvered into the overlay position when said material container is empty.

3. The closure assembly in accordance with claim 1 and where further a closure gasket secured to said annular surface of the discharge opening frame to sealably contact said closure plate when the plate is pressurably urged by said cam means in said first position, and prevent leakage along said one end surface of the frame during withdrawal of said closure plate when said cam means is maneuvered to said second position to urge said bracket means and sealing gasket into pressurable contact with said closure plate.

4. The closure assembly in accordance with claim 1 and wherein said cam means comprises a pair of elongate members, means rotatably mounting each of said members about their respective longitudinal axes located parallel to opposite sides of said frame and adjacent to said one end surface thereof, and in parallel confronting alignment with each other;

a plurality of first cam elements mounted on each of said elongate members shaped to engage and displace said closure plate into engagement with said annular surface;

and a second cam element mounted on each of said elongate members shaped to engage and displace said bracket means and sealing gasket into engagement with said closure plate or said one end surface of the frame;

said first and second cam elements in registration with each other so that
   1. when said cam means is rotated to said first position said first cam elements are located to engage said closure plate and said second cam element is located out of contact with said bracket means, and
   2. when said cam means is rotated to said second position said first cam elements are located out of contact with said closure plate and said second cam element is located to engage said bracket means and sealing gasket and
      i. urge the latter into contact with said closure plate, or
      ii. with said one end of the discharge opening frame.

5. The closure assembly in accordance with claim 4 and wherein further said second cam element is shaped to engage and displace said bracket means and sealing gasket in two distinct steps of angular rotation of said cam means, said first step corresponding to said second position of said cam means and said second step corresponding to said third step for urging said bracket means and sealing gasket into contact with said closure plate and said second step for urging said bracket means and sealing gasket into contact with said one end surface of the frame and closure gasket carried thereon.

* * * * *